Aug. 26, 1930.    W. A. MAXWELL    1,774,388
CULTIVATOR AND HARROW
Filed Jan. 23, 1929    2 Sheets-Sheet 1

W. A. Maxwell,
INVENTOR
BY Victor J. Evans
ATTORNEY

Aug. 26, 1930.   W. A. MAXWELL   1,774,388
CULTIVATOR AND HARROW
Filed Jan. 23, 1929   2 Sheets-Sheet 2
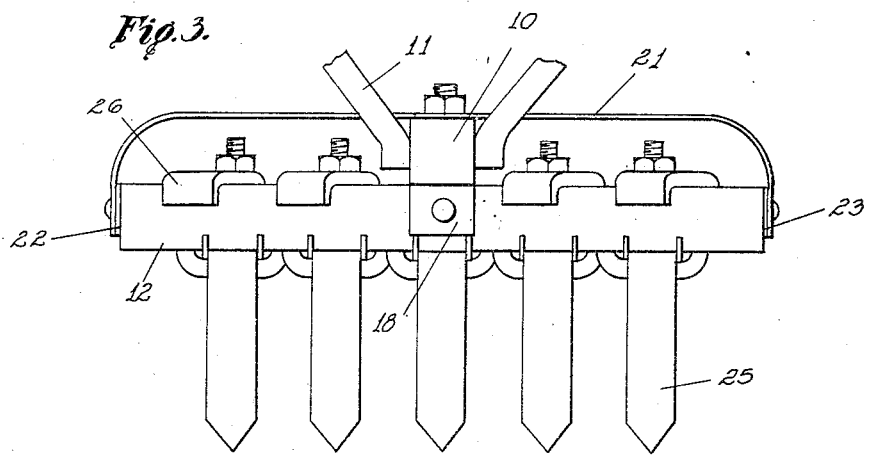
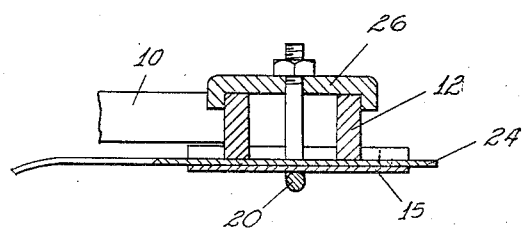 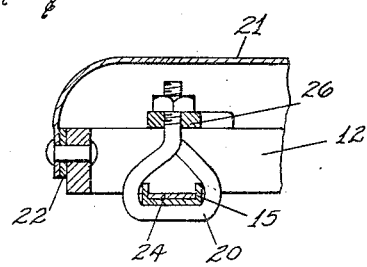
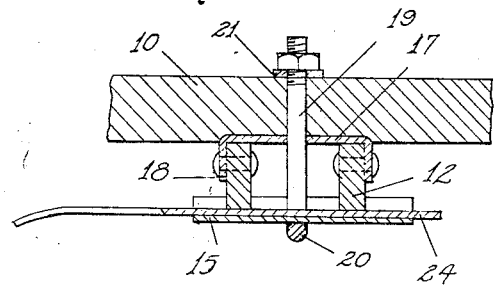 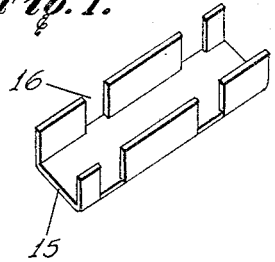
W. A. Maxwell
INVENTOR
BY Victor J. Evans
ATTORNEY Patented Aug. 26, 1930

1,774,388

UNITED STATES PATENT OFFICE

WILLIS A. MAXWELL, OF SONTAG, MISSISSIPPI

CULTIVATOR AND HARROW

Application filed January 23, 1929. Serial No. 334,487.

This invention relates to improvements in the agricultural art and which embodies a combined cultivator and harrow.

An object of the invention comprehends a tooth holder bar obliquely disposed with relation to the cultivator frame.

Another object of the invention contemplates locking plates included upon the tooth holder bar.

An additional object of the invention consists in the provision of adjusting elements for the locking plates whereby the teeth will be retained in positions relative to that of the tooth holder bar.

More specifically stated the tooth holder bar and cultivator frame are provided with brace members to retain the teeth in their initial adjusted positions.

With the above and other objects in view, the invention further consists of the following novel features and details of construction, to be hereinafter more fully described, illustrated in the accompanying drawings and pointed out in the appended claims.

In the drawings:—

Figure 3 is a rear elevation of the invention.

Figure 1:
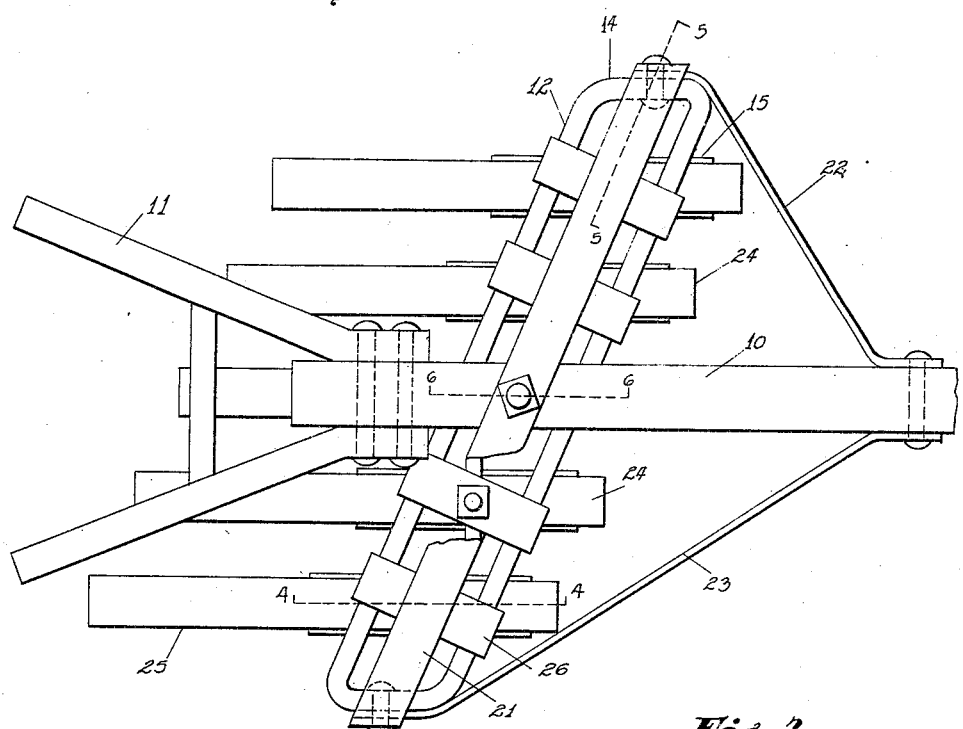
Figure 1 is a top plan view of the invention.

Figures 4, 5 and 6 are detail sectional views taken on lines 4—4, 5—5 and 6—6 respectively through Figure 1 of the drawings.

Figure 7 is a perspective view of one of the locking plates.

Referring to the drawings in detail, wherein like characters of reference denote corresponding parts, the reference character 10 indicates the tongue or beam of the cultivator frame having connection at its rearmost end with handle members 11. A tooth holder bar, such as indicated at 12, of elongated configuration and having the ends 14 thereof obliquely disposed, is adapted to be suspended at an intermediate point in its length beneath the under side of the beam or tongue 10.

A locking plate 15, of channel formation and having obliquely arranged registering cut-out portions 16 in the side walls therefor, is adapted to accommodate the depending portions of the tooth holder bar in the manner shown in Figure 6 of the drawings.

A bridge plate 17, reposing upon the upper side edges of the tooth holder bar 12, terminates to provide depending extremities 18 engageable with the outer surfaces of the tooth holder bar. An attaching element, such as indicated at 19, having its shank passed vertically through an opening in the beam or tongue 10, forms a loop 20 upon its lowermost end adapted to accommodate the locking plate 15 between the side walls of the tooth holder bar. A plate member 21, carried by the adjusting element 19, is bent upon itself at the extremities thereof for connection with the obliquely disposed ends 14 of the tooth holder bar 12, substantially as illustrated in Figures 3 and 5 of the drawings. Brace plates 22 and 23, of the configurations shown in Figure 1 of the drawings, are adapted to establish the means of connection between the obliquely disposed ends 14 of the tooth holder bar and the tongue or beam proper whereby independent shifting movement of the tooth holder bar with relation to the beam will be obviated.

Figure 2:
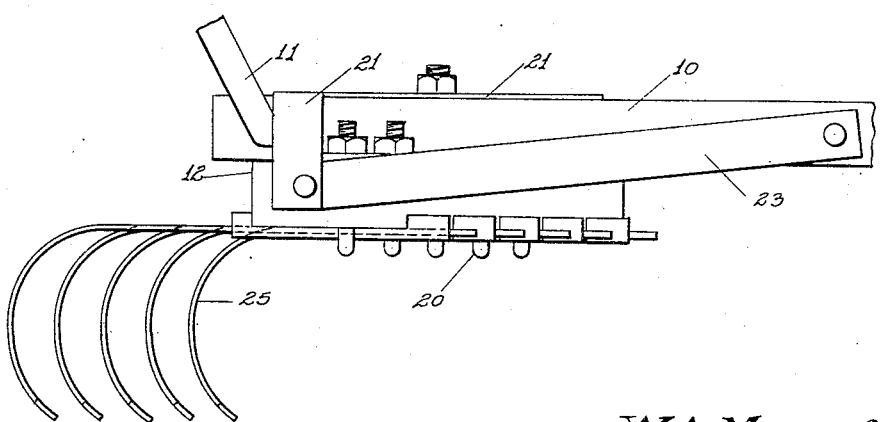
Figure 2 is a side elevation thereof.

As manifest from the illustration of my invention in Figures 1, 2 and 3 of the drawings, it is noted that a multiplicity of the locking plates, such as indicated at 15, are employed at regular intervals upon the under side of the tooth holder bar.

These additional plates are adapted to lockingly retain the shanks 24 of teeth 25 against displacement in a manner similar to the first mentioned locking plate. The same form of attaching element is employed for the additional locking plates in accordance with that shown in Figure 6 of the drawings having connection with the beam. Supporting plates 26, corresponding in shape to the bridge plate 17 are adapted to engage the upper side edges of the tooth holder bar 12, and to receive the uppermost projecting ends of the attaching elements. This construction facilitates adjustment of each of the cultivator teeth whereby the same may be readily extended and retracted with relation to the tooth holder bar.

The particular form of cultivator and harrow will loosen grass and weed sod, pulverize the soil and direct the weeds and grass sod to one side.

By reason of the fact that the teeth and frame are disposed in oblique angles to the draft line of the beam, less draft upon the cultivator will be required inasmuch as a deflecting rather than a pushing effect is exercised.

The invention is susceptible of various changes in its form, proportions and minor details of construction, and the right is herein reserved to make such changes as properly fall within the scope of the appended claims.

Having described the invention, what is claimed is:—

1. A combined cultivator and harrow comprisng a beam having handles at one end, a tooth holder bar of elongated configuration carried by and obliquely disposed upon the under side of the beam, locking plates mounted upon the under portions of the tooth holder bar, teeth carried between the locking plates and tooth holder bar, supporting plates carried upon the tooth holder bar and attaching elements carried by the locking plates and supporting plates to retain the teeth against displacement.

2. A combined cultivator and harrow comprising a beam having handles at one end, a tooth holder bar of elongated configuration carried by and obliquely disposed upon the under side of the beam, retaining plates of channel form having registering obliquely disposed cut-out portions in the side walls thereof adapted to accommodate the depending portions of the tooth holder bar, cultivator teeth having the shanks therefor interposed between the retaining plates and the tooth holder bar, attaching elements having the shanks therefor extended upwardly between the inner side walls of the tooth holder bar, and hook portions formed upon the lowermost extremities of the attaching elements to accommodate the retaining plates and attaching shanks of the cultivator teeth.

In testimony whereof I affix my signature.

WILLIS A. MAXWELL.